(12) United States Patent
Wu et al.

(10) Patent No.: US 11,668,608 B2
(45) Date of Patent: Jun. 6, 2023

(54) TEMPERATURE MEASUREMENT SYSTEM AND TEMPERATURE MEASUREMENT METHOD

(71) Applicant: Tokyo Electron Limited, Tokyo (JP)

(72) Inventors: Tong Wu, Miyagi (JP); Kenji Nagai, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 304 days.

(21) Appl. No.: 17/063,816

(22) Filed: Oct. 6, 2020

(65) Prior Publication Data
US 2021/0102847 A1  Apr. 8, 2021

(30) Foreign Application Priority Data

Oct. 7, 2019  (JP) .............................. JP2019-184525

(51) Int. Cl.
*G01J 3/427* (2006.01)
*G01K 11/125* (2021.01)
*G01N 21/41* (2006.01)
*G01K 7/02* (2021.01)
*G01N 21/71* (2006.01)

(52) U.S. Cl.
CPC ............... *G01K 7/02* (2013.01); *G01J 3/427* (2013.01); *G01K 11/125* (2013.01); *G01N 21/41* (2013.01); *G01N 21/71* (2013.01); *G01N 2201/1211* (2013.01)

(58) Field of Classification Search
USPC ................................................ 374/120, 130
See application file for complete search history.

(56) References Cited

U.S. PATENT DOCUMENTS

| 5,683,180 | A | * | 11/1997 | De Lyon | ................ G01K 11/12 374/161 |
| 9,995,628 | B1 | * | 6/2018 | Han | .................... G01K 11/3206 |
| 2012/0327393 | A1 | * | 12/2012 | Matsudo | ............... G01J 5/0007 356/43 |
| 2012/0327394 | A1 | * | 12/2012 | Matsudo | ............... G01J 5/0007 356/43 |

(Continued)

FOREIGN PATENT DOCUMENTS

JP  2012-109472 A  6/2012
JP  2013-029487 A  2/2013

*Primary Examiner* — Mirellys Jagan
(74) *Attorney, Agent, or Firm* — Pearne & Gordon LLP

(57) ABSTRACT

A temperature measurement system configured to measure a temperature of a target object having a first main surface and a second main surface includes a light source unit configured to emit output light penetrating the target object and including a first wavelength range and a second wavelength range; a measurement unit configured to measure a spectrum of reflected light; an optical path length ratio calculator configured to calculate an optical path length ratio between the output light of the first wavelength range and the output light of the second wavelength range; and a temperature calculator configured to calculate the temperature of the target object based on the optical path length ratio and a previously investigated relationship between the temperature of the target object and a refractive index ratio between the output light of the first wavelength range and the output light of the second wavelength range.

7 Claims, 13 Drawing Sheets

(56) References Cited

U.S. PATENT DOCUMENTS

| | | | | |
|---|---|---|---|---|
| 2013/0128275 | A1* | 5/2013 | Matsudo | G01B 11/0633 356/451 |
| 2013/0314713 | A1* | 11/2013 | Nagai | G01K 11/125 374/162 |
| 2015/0168130 | A1* | 6/2015 | Matsudo | H01J 37/32642 374/161 |
| 2015/0168231 | A1* | 6/2015 | Koshimizu | G01B 9/02044 118/712 |
| 2015/0176974 | A1* | 6/2015 | Matsudo | H01J 37/32972 250/341.8 |
| 2015/0185092 | A1* | 7/2015 | Koshimizu | H01J 37/32917 374/29 |
| 2021/0151285 | A1* | 5/2021 | Kobayashi | H01L 21/67248 |

* cited by examiner

TEMPERATURE MEASUREMENT SYSTEM AND TEMPERATURE MEASUREMENT METHOD

CROSS-REFERENCE TO RELATED APPLICATION

This application claims the benefit of Japanese Patent Application No. 2019-184525 filed on Oct. 7, 2019, the entire disclosures of which are incorporated herein by reference.

TECHNICAL FIELD

The various aspects and embodiments described herein pertain generally to a temperature measurement system and a temperature measurement method.

BACKGROUND

Patent Document 1 describes a temperature measurement system configured to measure a temperature of a measurement target object by using optical interference. This system includes a light source, an optical circulator, a collimator, a spectrometer, an optical path length calculator and a temperature calculator. Measurement light from the light source is reflected on both end surfaces of the measurement target object, and then, reflected lights reach the spectrometer via the collimator and the optical circulator. The spectrometer measures an interference intensity distribution which is an intensity distribution of the reflected lights. The optical path length calculator calculates an optical path length corresponding to a thickness of the measurement target object by performing Fourier transform on the interference intensity distribution. The temperature calculator calculates a temperature of the measurement target object based on temperature correction data indicating a relationship between the temperature and the optical path length. This relationship is previously investigated for each measurement target object.

Patent Document 1: Japanese Patent Laid-open Publication No. 2013-029487

SUMMARY

In one exemplary embodiment, there is provided a temperature measurement system configured to measure a temperature of a measurement target object having a first main surface and a second main surface facing the first main surface. The temperature measurement system includes a light source unit configured to emit output light penetrating the measurement target object and including a first wavelength range and a second wavelength range different form the first wavelength range; at least one optical element configured to output the output light from the light source unit to the first main surface of the measurement target object and receive reflected light from the first main surface and the second main surface; a measurement unit connected to the at least one optical element and configured to measure a spectrum of the reflected light from the first main surface and the second main surface, the spectrum being dependent on a wavelength; an optical path length ratio calculator configured to calculate, by performing Fourier transform on the spectrum measured by the measurement unit, an optical path length ratio which is a ratio between a first optical path length as an optical path length of the output light of the first wavelength range and a second optical path length as an optical path length of the output light of the second wavelength range; and a temperature calculator configured to calculate the temperature of the measurement target object based on the optical path length ratio and a previously investigated relationship between the temperature of the measurement target object and a refractive index ratio which is a ratio between a first refractive index as a refractive index of the measurement target object with respect to the output light of the first wavelength range and a second refractive index as a refractive index of the measurement target object with respect to the output light of the second wavelength range.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 7A presents a light source spectrum showing an intensity distribution which is dependent on a wavelength; FIG. 7B, a reflected light spectrum showing an intensity distribution which is dependent on a wavelength; and FIG. 7C, a reflected light spectrum showing an intensity distribution which is dependent on a reciprocal of a wavelength;

FIG. 8A presents a spectrum acquired by linearly interpolating the reflected light spectrum indicating the intensity distribution which is dependent on the reciprocal of the wavelength; FIG. 8B, a spectrum acquired by performing fast Fourier transform on the reflected light spectrum of FIG. 8A; and FIG. 8C, a partially enlarged view of FIG. 8B;

DETAILED DESCRIPTION

Figure 1:
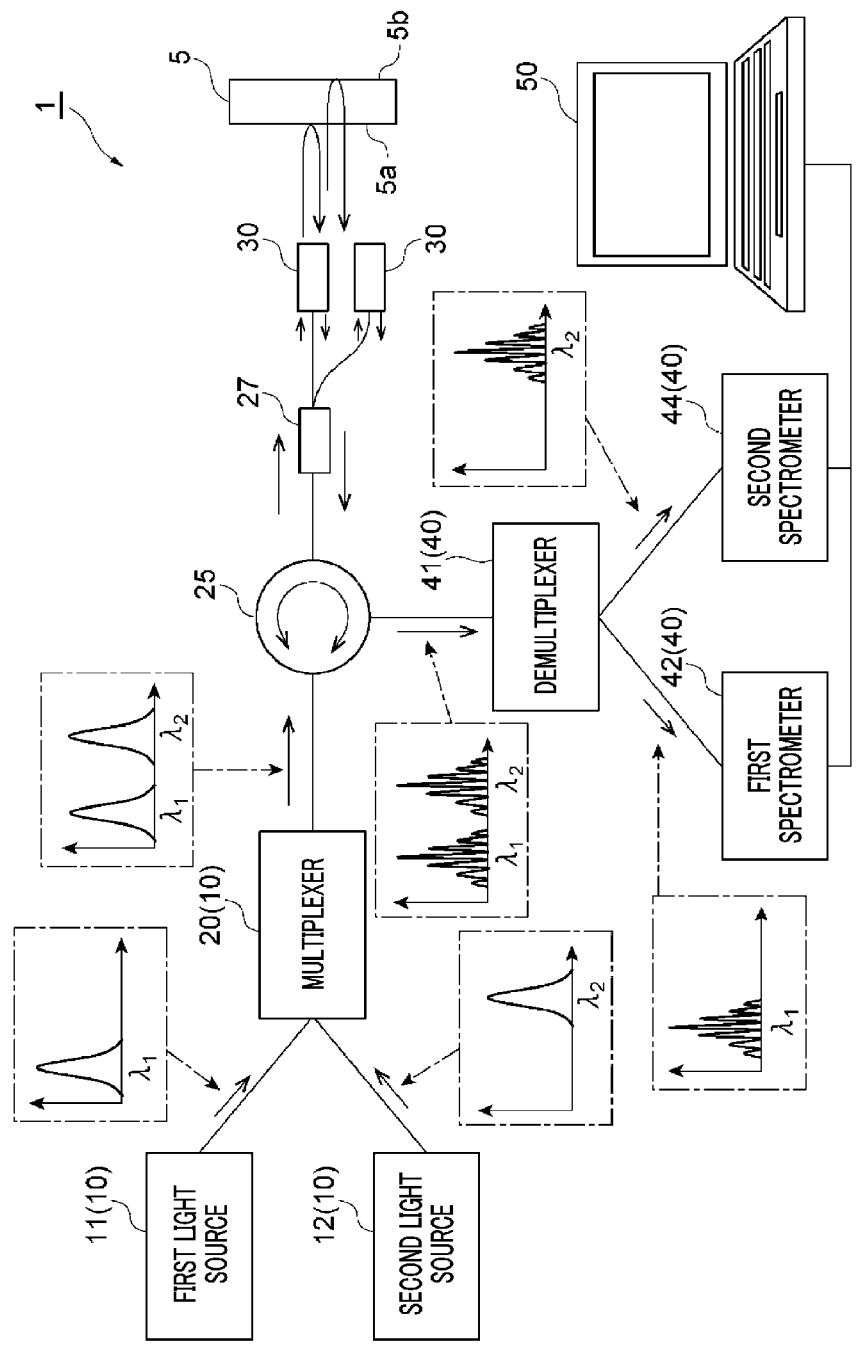
FIG. 1 is a diagram schematically illustrating a temperature measurement system according to an exemplary embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Hereinafter, various exemplary embodiments will be described.

In a method described in Patent Document 1, if a thickness of a measurement target object is reduced due to, for example, a wear-out, an optical path length corresponding to the thickness of the measurement target object is shortened. As a result, a temperature calculator may not calculate a temperature of the measurement target object accurately. Thus, there is a demand for a temperature measurement system and a temperature measurement method capable of measuring the temperature of the measurement target object accurately.

Exemplary embodiments provide a temperature measurement system and a temperature measurement method capable of measuring a temperature of a measurement target object with high accuracy.

In one exemplary embodiment, there is provided a temperature measurement system configured to measure a temperature of a measurement target object having a first main surface and a second main surface facing the first main surface. The temperature measurement system includes a light source unit configured to emit output light penetrating the measurement target object and including a first wavelength range and a second wavelength range different form the first wavelength range; at least one optical element configured to output the output light from the light source unit to the first main surface of the measurement target object and receive reflected light from the first main surface and the second main surface; a measurement unit connected to the at least one optical element and configured to measure a spectrum of the reflected light from the first main surface and the second main surface, the spectrum being dependent on a wavelength; an optical path length ratio calculator configured to calculate, by performing Fourier transform on the spectrum measured by the measurement unit, an optical path length ratio which is a ratio between a first optical path length as an optical path length of the output light of the first wavelength range and a second optical path length as an optical path length of the output light of the second wavelength range; and a temperature calculator configured to calculate the temperature of the measurement target object based on the optical path length ratio and a previously investigated relationship between the temperature of the measurement target object and a refractive index ratio which is a ratio between a first refractive index as a refractive index of the measurement target object with respect to the output light of the first wavelength range and a second refractive index as a refractive index of the measurement target object with respect to the output light of the second wavelength range.

According to this temperature measurement system, the optical path length ratio is calculated from the first optical path length of the output light of the first wavelength range and the second optical path length of the output light of the second wavelength range. An optical path length of output light is expressed as a product of a refractive index of the measurement target object with respect to the output light and a thickness of the measurement target object. The thickness of the measurement target object depends on a reference value determined by a physical property of the measurement target object and a fluctuation rate by a temperature with respect to the reference value, and does not depend on a wavelength of the output light. When the optical path length ratio which is the ratio between the first optical path length and the second optical path length is calculated, terms of the reference value and the fluctuation rate included in the first optical path length and the second optical path length are canceled. Therefore, the optical path length ratio between the first optical path length and the second optical path length is expressed as a refractive index ratio which is a ratio between a refractive index of the measurement target object with respect to the output light of the first wavelength range and a refractive index of the measurement target object with respect to the output light of the second wavelength range. A refractive index depends on a wavelength range of output light and a temperature of the measurement target object. A relationship between the refractive index ratio and the temperature is previously acquired. This previously acquired relationship between the refractive index ratio and the temperature indicates a relationship between the optical path length ratio and the temperature. The temperature measurement system is capable of calculating the temperature of the measurement target object based on the calculated optical path length ratio and the relationship between the refractive index ratio and the temperature. In this temperature measurement system, even if the thickness of the measurement target object is reduced due to, for example, a wear-out, the temperature calculator is still capable of calculating the temperature of the measurement target object with high accuracy since the variation of the thickness does not affect the optical path length ratio. Further, in the temperature measurement system, if the relationship between the optical path length ratio and the temperature is already known, a relationship between a temperature and an optical path length at that temperature need not be corrected for each measurement target object before the temperature measurement, unlike in conventional cases. Accordingly, as compared to a case where the relationship between the temperature and the optical path length at that temperature is corrected for each measurement target object, the temperature measurement system is capable of simplifying a measurement sequence.

In the exemplary embodiment, the light source unit may include a first light source configured to emit light of the first wavelength range; a second light source configured to emit light of the second wavelength range; and a multiplexer configured to propagate the output light obtained by multiplexing the light of the first wavelength range and the light of the second wavelength range. In this configuration, the temperature measurement system is capable of allotting the light source for each wavelength range of the output light as a target of measurement.

In the exemplary embodiment, the measurement unit may include a first spectrometer configured to measure the spectrum of first reflected light which is the reflected light from the first main surface and the second main surface generated by the output light of the first wavelength range; and a second spectrometer configured to measure the spectrum of second reflected light which is the reflected light from the first main surface and the second main surface generated by the output light of the second wavelength range. In this configuration, the first spectrometer is capable of narrowing a distribution measurement range thereof to a wavelength range suitable for the measurement of the first reflected light, and the second spectrometer is capable of narrowing a distribution measurement range thereof to a wavelength range suitable for the measurement of the second reflected light. Accordingly, resolution of each of the first spectrometer and the second spectrometer can be increased, so that the temperature measurement system is capable of measuring spectrum with high accuracy.

In the exemplary embodiment, the at least one optical element may include multiple optical elements. In this configuration, since the temperature measurement system is equipped with the multiple optical elements, multi-point measurement can be performed.

In the exemplary embodiment, the measurement target object may be made of silicon. The first wavelength range may be from 1200 nm to 1300 nm, and the second wavelength range may be from 1500 nm to 1600 nm. In this configuration, the temperature measurement system is capable of suppressing absorption of the output light of the first wavelength range and the output light of the second wavelength range by the silicon. Further, the material of the measurement target object among components within a chamber is not limited to the silicon as long as the material does not attenuate a quantity of measurement light. By way of example, the measurement target object may be made of quartz, sapphire, silicon carbide, or the like.

In the exemplary embodiment, the at least one optical element may be provided in a substrate processing apparatus configured to accommodate the measurement target object therein, and the measurement target object may be at least one of a substrate, a focus ring or an upper electrode. In this configuration, the temperature measurement system is capable of measuring a temperature of at least one of the substrate, the focus ring or the upper electrode accurately.

In another exemplary embodiment, there is provided a temperature measurement method of measuring a temperature of a measurement target object having a first main surface and a second main surface facing the first main surface. The temperature measurement method includes irradiating, to the measurement target object, output light penetrating the measurement target object and including a first wavelength range and a second wavelength range different form the first wavelength range; measuring a spectrum of reflected light from the first main surface and the second main surface of the measurement target object; calculating, by performing Fourier transform on the spectrum, an optical path length ratio which is a ratio between a first optical path length as an optical path length of the output light of the first wavelength range and a second optical path length as an optical path length of the output light of the second wavelength range; and calculating the temperature of the measurement target object based on the optical path length ratio and a previously investigated relationship between the temperature of the measurement target object and a refractive index ratio which is a ratio between a first refractive index as a refractive index of the measurement target object of the output light of the first wavelength range and a second refractive index as a refractive index of the measurement target object of the output light of the second wavelength range.

According to the temperature measurement method, the optical path length ratio is calculated from the first optical path length of the output light of the first wavelength range and the second optical path length of the output light of the second wavelength range. An optical path length of output light is expressed as a product of a refractive index of the measurement target object with respect to output light and a thickness of the measurement target object. The thickness of the measurement target object depends on a reference value determined by a physical property of the measurement target object and a fluctuation rate by temperature with respect to the reference value, and does not depend on a wavelength of the output light. In the calculating of the optical path length ratio, when the optical path length ratio which is the ratio between the first optical path length and the second optical path length is calculated, terms of the reference value and the fluctuation rate included in the first optical path length and the second optical path length are canceled. Therefore, the optical path length ratio between the first optical path length and the second optical path length is expressed as a refractive index ratio which is a ratio between a refractive index of the measurement target object with respect to the output light of the first wavelength range and a refractive index of the measurement target object with respect to the output light of the second wavelength range. A refractive index depends on a wavelength range of output light and a temperature of the measurement target object. A relationship between the refractive index ratio and the temperature is previously acquired. This previously acquired relationship between the refractive index ratio and the temperature indicates a relationship between the optical path length ratio and the temperature. In the calculating of the temperature of the temperature measurement method, the temperature of the measurement target object can be calculated based on the calculated optical path length ratio and the relationship between the refractive index ratio and the temperature. In this temperature measurement method, even if the thickness of the measurement target object is reduced due to, for example, a wear-out, the temperature of the measurement target object can be calculated with high accuracy since the variation of the thickness does not affect the optical path length ratio. Further, in the temperature measurement method, if the relationship between the optical path length ratio and the temperature is already known, a relationship between a temperature and an optical path length at that temperature need not be corrected for each measurement target object before temperature measurement, unlike in conventional cases. Accordingly, as compared to a case where the relationship between the temperature and the optical path length at that temperature is corrected for each measurement target object, the temperature measurement method is capable of simplifying a measurement sequence.

Hereinafter, various exemplary embodiments will be explained in detail with reference to the accompanying drawings. In the following description and the various drawings, same or corresponding parts will be assigned same reference numerals, and redundant description thereof will be omitted. Further, ratios of sizes in the respective drawings do not necessarily coincide with ratios of sizes to be described. "Left," "right," "up," and "down" are based on an illustrated state, and are defined for the convenience of explanation.

FIG. 1 is a configuration view illustrating an example of a temperature measurement system according to an exemplary embodiment. The temperature measurement system 1 shown in FIG. 1 is a system configured to measure a temperature of a measurement target object 5. The temperature measurement system 1 measures the temperature by using optical interference. The temperature measurement system 1 includes a light source unit 10, an optical element 30 configured to output light to a space, a measurement unit 40, and an operation device 50. The temperature measurement system 1 may be further equipped with an optical circulator 25 and an optical switch 27. The light source unit 10, the optical circulator 25, the optical switch 27, the optical element 30 and the measurement unit 40 are connected with each other with an optical fiber cable.

The measurement target object 5 is of, for example, a plate shape, and has a first main surface 5a and a second main surface 5b facing the first main surface 5a. In the following, when necessary, the first main surface 5a will be referred to as a front surface 5a, and the second main surface 5b will be referred to as a rear surface 5b. The measurement target object 5 as a target of measurement is made of at least one of, but not limited to, Si (silicon), $SiO_2$ (quartz), $Al_2O_3$ (sapphire) and SiC (silicon carbide).

The light source unit 10 is configured to emit output light which includes a first wavelength range and a second wavelength range different from the first wavelength range and penetrates the measurement target object 5. The light source unit 10 includes, by way of non-limiting example, a first light source 11, a second light source 12, and a multiplexer 20.

The first light source 11 is configured to emit light having a wavelength penetrating the measurement target object 5. The first light source 11 emits light of the first wavelength range. The first wavelength range is in a range from, e.g., 1200 nm to 1300 nm. By way of non-limiting example, a SLD (Super Luminescent Diode) is used as the first light source 11.

The second light source 12 is configured to emit light having a wavelength penetrating the measurement target object 5. The second light source 12 emits light of the second wavelength range different form the first wavelength range. The second wavelength range is in a range from, e.g., 1500 nm to 1600 nm. By way of non-limiting example, a SLD is used as the second light source 12.

The multiplexer 20 is configured to propagate output light obtained by multiplexing the light of the first wavelength range outputted from the first light source 11 and the light of the second wavelength range outputted from the second light source 12. The multiplexer 20 outputs the multiplexed output light to the optical circulator 25.

The optical circulator 25 is connected with the multiplexer 20, the optical switch 27 and the measurement unit 40. The optical circulator 25 is configured to propagate the output light generated by the multiplexer 20 to the optical element 30 via the optical switch 27.

The optical switch 27 is connected with the optical circulator 25 and the optical element 30. The optical switch 27 is configured to propagate the output light, which is sent from the multiplexer 20 via the optical circulator 25, to the optical element 30. In a configuration where multiple optical elements 30 are provided, the optical switch 27 propagates the multiplexed output light to each of these multiple optical elements 30.

The optical element 30 is configured to output the output light to the front surface 5a of the measurement target object 5. The optical element 30 outputs the output light adjusted into parallel rays to the measurement target object 5. Further, the optical element 30 is also configured to receive reflected light from the measurement target object 5. The reflected light includes reflected light from the rear surface 5b as well as reflected light from the front surface 5a. The optical element 30 propagates the reflected light to the optical switch 27. The optical switch 27 propagates the reflected light to the measurement unit 40 via the optical circulator 25. The temperature measurement system 1 is equipped with at least one optical element 30. The temperature measurement system 1 may be equipped with the multiple optical elements 30. Each optical element 30 may be, by way of example, but not limitation, a collimator or a focuser.

Figure 2:
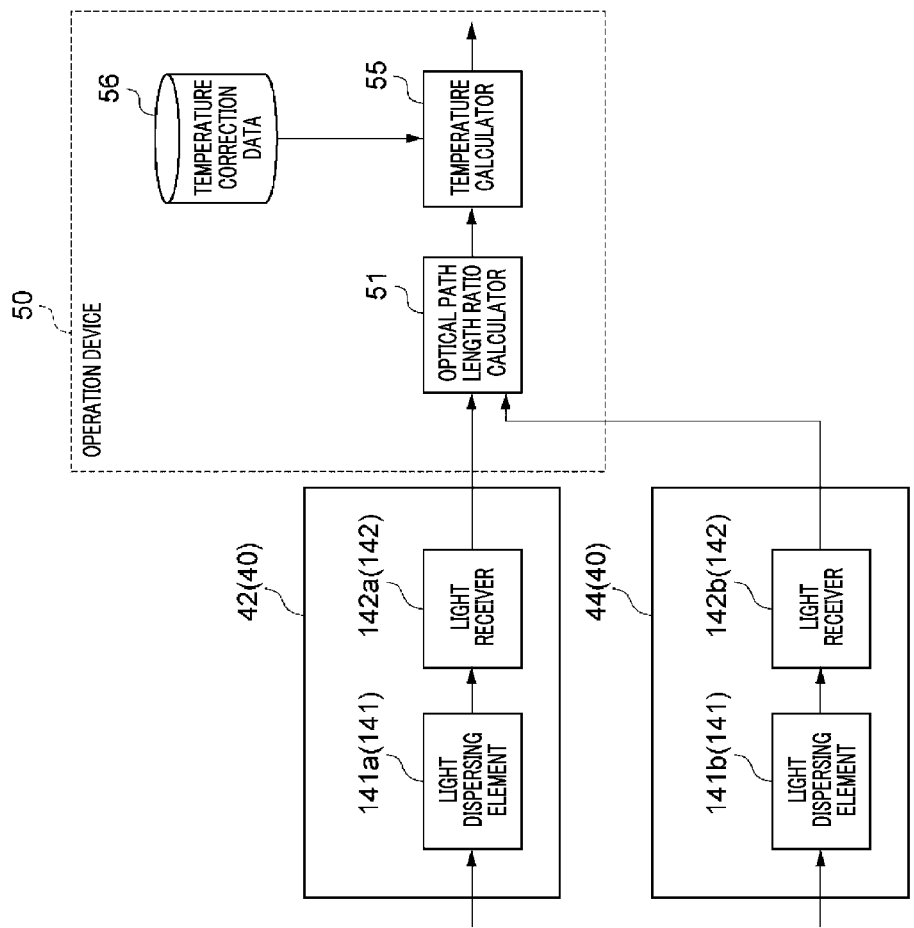
FIG. 2 is a functional block diagram of spectrometers and an operation device.

The measurement unit 40 is configured to measure a spectrum of the reflected light obtained from the optical circulator 25. This reflected light spectrum indicates a wavelength-dependent or frequency-dependent intensity distribution of the reflected light. FIG. 2 is a functional block diagram of the measurement unit 40 and the operation device 50. As depicted in FIG. 2, the measurement unit 40 includes, for example, a light dispersing element 141 and a light receiver 142. The light dispersing element 141 is, for example, a diffraction grating, and is configured to disperse light at a preset dispersion angle for each wavelength. The light receiver 142 is configured to receive the light dispersed by the light dispersing element 141. By way of non-limiting example, a CCD (Charge Coupled Device) in which multiple light receiving elements are arranged in a lattice shape is used as the light receiver 142. The number of the light receiving elements is a sampling number. Further, a wavelength span is defined based on the dispersion angle of the light dispersing element 141 and a distance between the light dispersing element 141 and the light receiving element. Accordingly, the reflected light is dispersed at each wavelength or each frequency, and an intensity thereof is acquired for each wavelength or each frequency. The measurement unit 40 outputs the reflected light spectrum to the operation device 50.

The measurement unit 40 may be equipped with a demultiplexer 41, a first spectrometer 42, and a second spectrometer 44. The demultiplexer 41 is connected to the optical circulator 25, the first spectrometer 42 and the second spectrometer 44. When the measurement unit 40 has the multiple spectrometers, the demultiplexer 41 propagates the reflected light obtained from the optical circulator 25 to each spectrometer.

The first spectrometer 42 is configured to measure a reflected light spectrum of first reflected light which is generated by the output light of the first wavelength range and reflected from the front surface 5a and the rear surface 5b. The first spectrometer 42 outputs this reflected light spectrum to the operation device 50. The second spectrometer 44 is configured to measure a reflected light spectrum of second reflected light which is generated by the output light of the second wavelength range and reflected from the front surface 5a and the rear surface 5b. The second spectrometer 44 outputs this reflected light spectrum to the operation device 50. The first spectrometer 42 and the second spectrometer 44 have the same configuration. That is, the first spectrometer 42 may be equipped with, for example, a light dispersing element 141a and a light receiver 142a, and the second spectrometer 44 may be equipped with a light dispersing element 141b and a light receiver 142b.

The operation device 50 is configured to measure a temperature of the measurement target object 5 based on the reflected light spectrum. The operation device 50 includes an optical path length ratio calculator 51, a temperature calculator 55 and temperature correction data 56. The optical path length ratio calculator 51 is configured to perform fast Fourier transform (FFT) on the reflected light spectrum. By way of example, if Fourier transform in a time domain is performed, a reflected light spectrum indicating an intensity distribution dependent on a frequency (an oscillation frequency per unit time) is converted to a reflected light spectrum indicating an intensity distribution dependent on time. Further, by way of another example, if Fourier transform in a space domain is performed, a reflected light spectrum indicating an intensity distribution dependent on a spatial frequency (an oscillation frequency per unit length) is converted to a reflected light spectrum indicating an intensity distribution dependent on a position. The optical path length ratio calculator 51 interpolates data points in a range including a preset peak value of the reflected light spectrum after being subjected to the Fourier transform. The optical path length ratio calculator 51 calculates a center position of the preset peak value of the reflected light spectrum after being subjected to the Fourier transform.

The optical path length ratio calculator 51 is configured to calculate an optical path length ratio indicating a ratio between a first optical path length which is an optical path length of the output light of the first wavelength range and a second optical path length which is an optical path length of the output light of the second wavelength range. First, the optical path length ratio calculator 51 calculates the first optical path length and the second optical path length based on, for example, the center position. Then, the optical path length ratio calculator 51 calculates a valve obtained by, for example, dividing the first optical path length by the second optical path length as an optical path length ratio.

The temperature calculator 55 is configured to calculate the temperature of the measurement target object 5 based on the optical path length ratio and a previously investigated relationship between a refractive index ratio and the temperature of the measurement target object 5. Here, the refractive index ratio is a ratio between a first refractive index which is a refractive index of the measurement target object 5 with respect to the output light of the first wavelength range and a second refractive index which is a refractive index of the measurement target object 5 with respect to the output light of the second wavelength range. By way of example, the temperature calculator 55 uses a value obtained by dividing the first refractive index by the second refractive index as the refractive index ratio. The temperature correction data 56 includes the previously investigated relationship between the refractive index ratio and the temperature of the measurement target object 5. The temperature calculator 55 calculates the temperature of the measurement target object 5 based on the temperature correction data 56 and the optical path length ratio.

Figure 3:
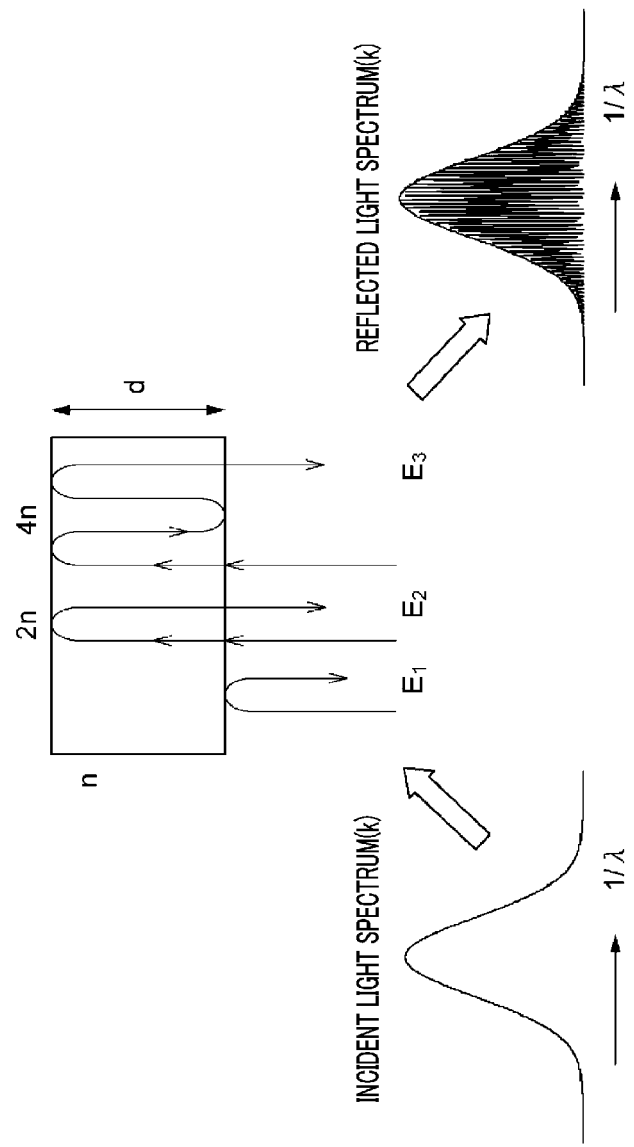
FIG. 3 is a diagram for describing an outline of an incident light spectrum and a reflected light spectrum.

In the temperature measurement system 1 having the above-described configuration, the temperature of the measurement target object 5 is measured by using optical interference between the front surface 5a and the rear surface 5b of the measurement target object 5 (FFT frequency-domain method). Here, the principle of the optical interference will be explained. FIG. 3 is a diagram for describing an outline of an incident light spectrum and a reflected light spectrum. In an example of FIG. 3, measurement light having a wavelength λ from a certain light source is set as incident light. An incident light spectrum intensity S(k) depends on a spatial frequency 1/λ (an oscillation frequency per unit length). A wavenumber k is $2\pi/\lambda$. A thickness of the measurement target object 5 is set to be d; a refractive index, n; and reflectance, R. Reflected light E is a superposition of multiple reflected components. By way of example, $E_1$ is a reflected component on the front surface 5a. $E_2$ is a reflected component on the rear surface 5b. $E_3$ is a reflected component reflected on the front surface 5a once and reflected on the rear surface 5b twice. Further, illustration of reflected components from $E_4$ is omitted. A reflected light spectrum intensity I(k) is obtained as these multiple reflected components are superposed. The reflected light spectrum intensity I(k) and the incident light spectrum intensity S(k) has a relationship represented by the following expression.

[Expression 1]

$$I(k) \propto \{2R(1-R)-2R(1-2R)\cos(2nkd)-2R^2\cos(4nkd)\}S(k) \qquad (1)$$

In the above expression (1), the second term is a term of front-rear surface interference. The third term is a term of multiple front-rear surface interference. If Fourier transform is performed on the expression (1), a position-dependent reflected light spectrum can be obtained.

Figure 4:
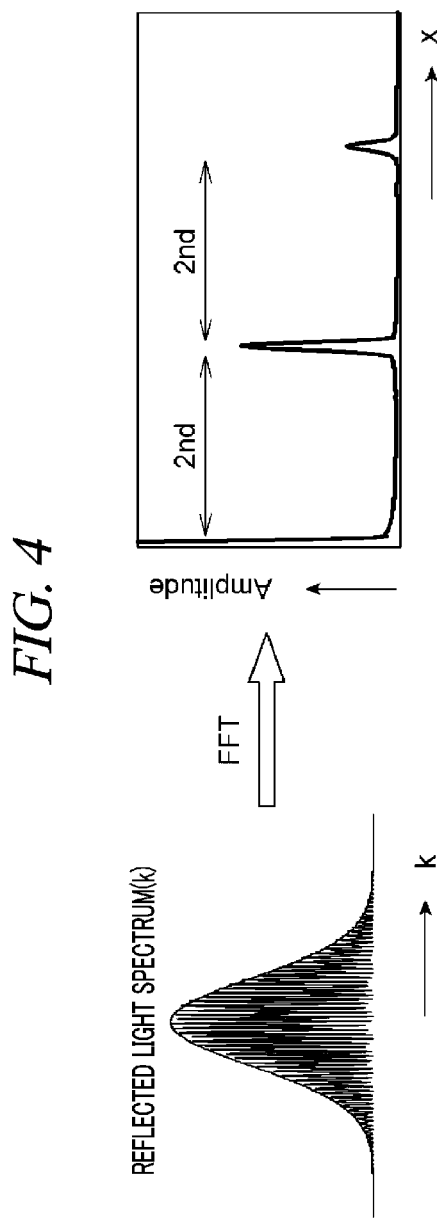
FIG. 4 is a diagram for describing an outline of Fourier transform of the reflected light spectrum.

FIG. 4 is a diagram for describing the Fourier transform of the reflected light spectrum. As depicted in FIG. 4, the spatial frequency 1/λ is converted to a position x by space domain Fourier transform. The reflected light spectrum intensity I(x) converted to the position x becomes as follows by performing the Fourier transform on the expression (1).

[Expression 2]

$$I(x)=2R(1-R)\cdot S(x)-R(1-2R)\cdot\{S(x+2nd)+S(x-2nd)\}-R^2\cdot\{S(x+4nd)+S(x-4nd)\} \qquad (2)$$

As indicated by the above expression (2), a peak vale appears every 2nd. 2nd is an optical path difference between the reflected light from the front surface and the reflected light from the rear surface. That is, nd is an optical path length between the front surface and the rear surface of the measurement target object 5. Further, though the space domain Fourier transform is used in the above description, time domain Fourier transform may be used.

Here, the optical path length nd will be described in detail. The refractive index n of the measurement target object 5 depends on the wavelength λ of the incident measurement light and the temperature T of the measurement target object light. Further, the thickness d of the measurement target object 5 relies on a reference value $d_0$ determined by a physical property of the measurement target object 5 and a fluctuation rate α by the temperature with respect to the reference value, and does not depend on the wavelength λ of the measurement light. Thus, the optical path length nd is represented by the following expression (3).

[Expression 3]

$$nd=n(\lambda,T)\cdot d_0\cdot\alpha(T) \qquad (3)$$

Assume that a refractive index of the measurement target object 5 is $n_1$ when output light (an example of the output light in the first wavelength range) having a wavelength $\lambda_1$ from the first light source 11 is incident light upon the measurement target object 5. A first optical path length $n_1d$ is represented by the following expression (4).

[Expression 4]

$$n_1d=n(\lambda_1,T)\cdot d_0\cdot\alpha(T) \qquad (4)$$

Assume that a refractive index of the measurement target object 5 is $n_2$ when output light (an example of the output light in the second wavelength range) having a wavelength $\lambda_2$ from the second light source 12 is incident light upon the measurement target object 5. A second optical path length $n_2 d$ is represented by the following expression (5).

[Expression 5]

$$n_2 d = n(\lambda_2, T) \cdot d_0 \cdot \alpha(T) \quad (5)$$

The optical path length ratio calculator 51 calculates an optical path length ratio which is a ratio between the first optical path length and the second optical path length by using the expressions (5) and (6). The optical path length ratio calculator 51 uses the following expression (6), for example.

[Expression 6]

$$\frac{n_1 d}{n_2 d} = \frac{n(\lambda_1, T) \cdot d_0 \cdot \alpha(T)}{n(\lambda_2, T) \cdot d_0 \cdot \alpha(T)} = \frac{n(\lambda_1, T)}{n(\lambda_2, T)} \quad (6)$$

As stated above, in the course of calculating the optical path length ratio at the same temperature T, the term of the reference value $d_0$ and the term of the fluctuation rate $\alpha$ included in the first optical path length and the second optical path length are canceled. Thus, the variation of the thickness of the measurement target object 5 does not affect the optical path length ratio. Accordingly, at the same temperature T, the optical path length ratio which is the ratio between the first optical path length and the second optical path length is expressed as the refractive index ratio which is the ratio between the first refractive index and the second refractive index.

Figure 5:
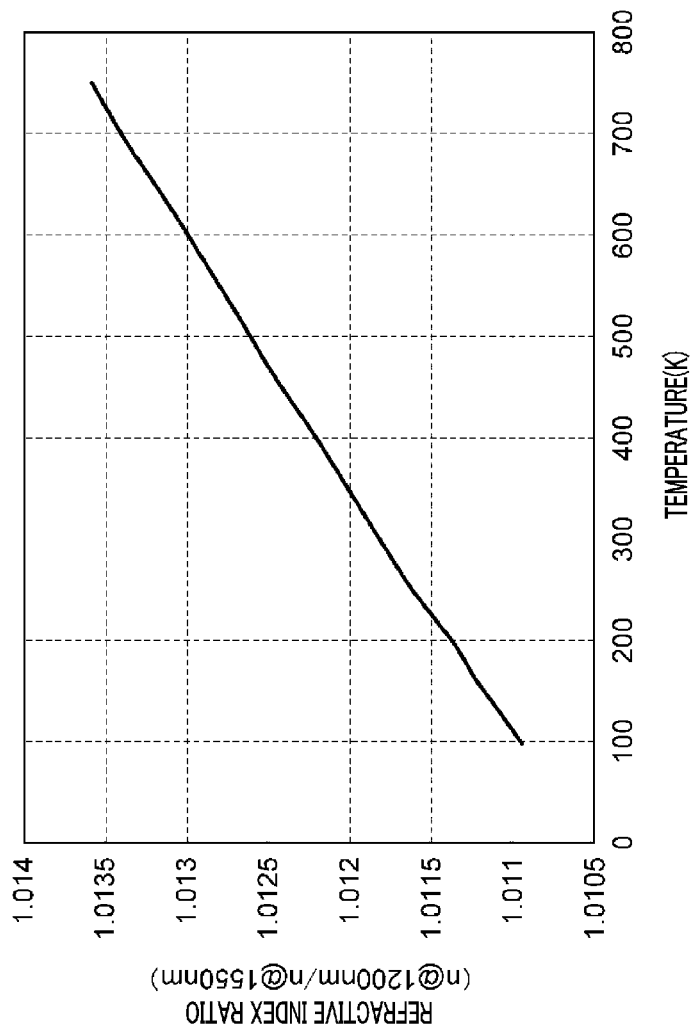
FIG. 5 presents an example of temperature correction data indicating a relationship between a refractive index ratio and a temperature of a measurement target object.

Now, a relationship between the refractive index ratio and the temperature of the measurement target object 5 will be explained. FIG. 5 shows an example of temperature correction data indicating the relationship between the refractive index ratio and the temperature of the measurement target object. A horizontal axis of FIG. 5 represents the temperature, and a vertical axis indicates the refractive index ratio. The temperature correction data 56 is previously acquired. The temperature correction data 56 may be acquired by a temperature corrector. As the temperature correction data 56, a temperature T of a sample made of the same material as the measurement target object 5 and a refractive index ratio at this temperature T are measured at the same time. The temperature T is measured by using, for example, a platinum thermoresistor. Since an optical path length ratio at the same temperature T is indicated by a refractive index ratio from the expression (6), a relationship between the optical path length ratio and the temperature is drawn from the relationship between the refractive index ratio and the temperature indicated by the temperature correction data 56. Accordingly, the temperature calculator 55 calculates the temperature of the measurement target object 5 based on the optical path length ratio and the relationship between the refractive index ratio and the temperature.

Figure 6:
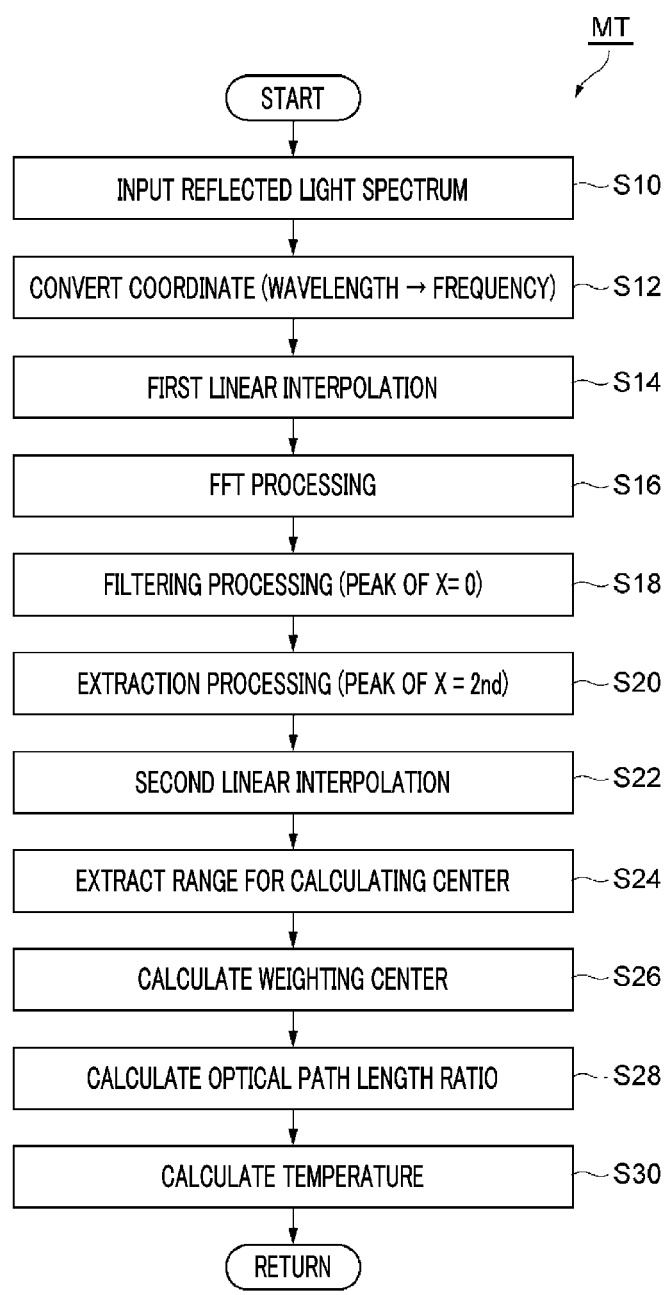
FIG. 6 is a flowchart illustrating a temperature measurement method according to the exemplary embodiment.

Now, a temperature measurement method as a temperature measuring operation of the temperature measurement system 1 will be explained. FIG. 6 is a flowchart illustrating the temperature measurement method according to the exemplary embodiment. The temperature measurement method MT shown in FIG. 6 is repeatedly performed at a preset interval from a time when the first light source 11, the second light source 12 and the operation device 50 are turned ON, for example.

Figure 7A:
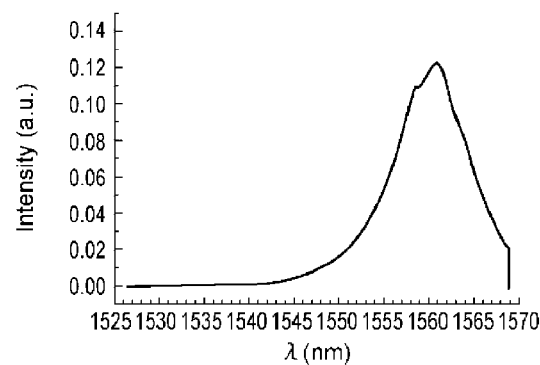
FIG. 7A to FIG. 7C are graphs for describing the temperature measurement method according to the exemplary embodiment.
Figure 7B:
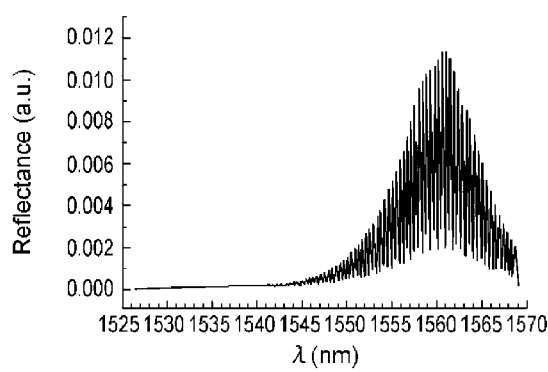

As shown in FIG. 6, a reflected light spectrum is inputted (S10). The first light source 11 emits light of the first wavelength range. The second light source 12 emits light of the second wavelength range. By way of example, the light of the second wavelength range has a spectrum as depicted in FIG. 7A. The multiplexer 20 multiplexes the light of the first wavelength range and the light of the second wavelength range, and irradiates output light to the measurement target object 5 through the optical circulator 25 and the optical element 30 (a process of irradiating the output light to the measurement target object). The first spectrometer 42 and the second spectrometer 44 belonging to the measurement unit 40 acquire spectrums of reflected lights reflected on the front surface 5a and the rear surface 5b of the measurement target object 5 (a process of measuring). By way of example, the second spectrometer 44 acquires a spectrum of second reflected light as shown in FIG. 7B. The optical path length ratio calculator 51 receives a spectrum of first reflected light and the spectrum of the second reflected light from the measurement unit 40. Upon the completion of this process S10, a coordinate transformation processing is performed (S12).

Figure 7C:
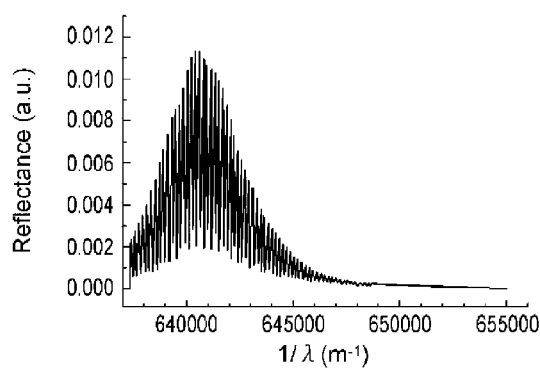

In the process S12, the optical path length ratio calculator 51 converts a coordinate axis of each spectrum obtained in the process S10 from a wavelength $\lambda$ to a spatial frequency $1/\lambda$. By way of example, the second reflected light has a spectrum as shown in FIG. 7C. Upon the completion of the process S12, a first data interpolation processing is performed (S14).

In the process S14, the optical path length ratio calculator 51 performs data interpolation of the spectrum obtained in the process S12. By way of example, assume that a sampling number is Ns, and a spatial frequency is in an array of $x_0$, $x_1$, $x_2$, . . . , $x_{N-1}$ and an intensity is in an array of $y_0$, $y_1$, $y_2$, . . . , $y_{N-1}$ as data of the spectrum. First, the optical path length ratio calculator 51 re-arranges the spatial frequency at a regular interval. By way of example, if a spatial frequency included in the array of the re-arranged spatial frequency is set as $X_i$, the rearrangement is carried out by using the following expression (7).

[Expression 7]

$$X_i = x_0 + \frac{x_{N-1} - x_0}{N_s - 1} \cdot i \quad (7)$$

Here, the optical path length ratio calculator 51 calculates an intensity at the rearranged spatial frequency $X_i$ by, for example, linear interpolation. If the intensity at this time is denoted by $Y_i$, this intensity $Y_i$ is calculated by the following expression (8).

[Expression 8]

$$Y_i = \frac{y_{j+1} - y_j}{x_{j+1} - x_j} \cdot (X_i - x_j) \quad (8)$$

Figure 8A:
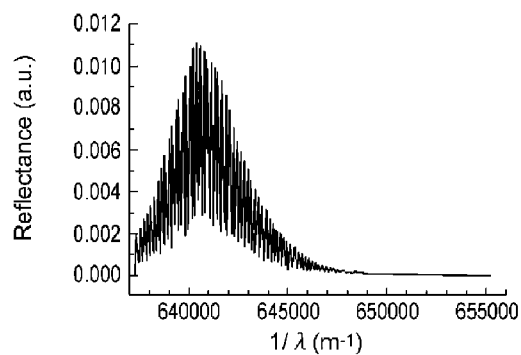
FIG. 8A to FIG. 8C are graphs for describing the temperature measurement method according to the exemplary embodiment.

Here, j denotes a maximum integer which satisfies an in equation of $X_i > x_j$. Accordingly, a spectrum as illustrated in FIG. 8A, for example, is obtained. Further, the intensity at the rearranged spatial frequency $X_i$ may be calculated by polynomial interpolation. Upon the completion of the process S14, a FFT processing is performed (S16).

Figure 8B:
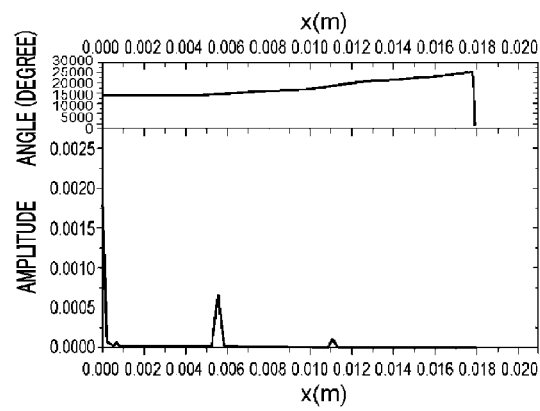

In the process S16, the optical path length ratio calculator 51 performs Fourier transform on the spectrum interpolated in the process S14 (Fourier transform process). Accordingly, as shown in FIG. 8B, a spectrum with a vertical axis indicating an amplitude and a horizontal axis indicating a phase is obtained. Upon the completion of the process S16, a filtering processing is performed (S18).

In the process S18, the optical path length ratio calculator 51 performs filtering of a peak value of X=0 from the spectrum obtained in the process S16. By way of example, 0 (zero) is put into the intensity data Y in a range from X=0 to X=Z (Z is a preset value). Upon the completion of the process S18, an extraction processing is performed (S20).

Figure 8C:
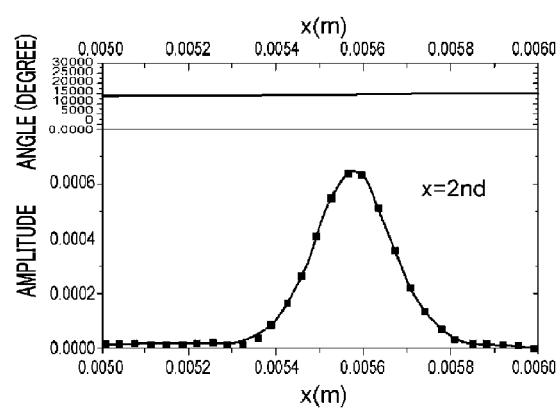

In the process S20, the optical path length ratio calculator 51 extracts a peak value of X=2nd from the spectrum obtained in the process S18. For example, if a maximum value of the peak is $Y_i$, twenty data points are extracted from $Y_{i-10}$. This is done to extract data from a center of the peak and therebelow. By way of example, if the maximum value of the peak is 1, the extraction is performed to include a range from the maximum value to 0.5. As a result, a spectrum as shown in FIG. 8C is extracted. Upon the completion of the process S20, a second data interpolation processing is performed (S22).

In the process S22, the optical path length ratio calculator 51 interpolates the data of the peak value of X=2nd which is obtained in the process S20 (data interpolation process). For instance, the optical path length ratio calculator 51 performs linear interpolation between the data points with an interpolation number N at a regular interval. The interpolation number N is previously set based on, for example, a required level of temperature accuracy. By way of example, the data interpolation is performed by using the following expression (9).

[Expression 9]

$$Y_i = (y_{j+1} - y_i) \frac{X_i - X_j}{X_{j+1} - X_j} \quad (9)$$

Here, j is an index used in the array of the intensity. The optical path length ratio calculator 51 operates the above expression (9) in a range of i=0 to N-1. That is, the calculation is performed for all the twenty data points obtained in the process S20. In this way, a data interval after the Fourier transform is divided into a required number of divisions (interpolation number N), and a number of data according to the number of divisions is linearly interpolated. Upon the completion of the process S22, an extraction processing is performed (S24).

In the process S24, the optical path length ratio calculator 51 extracts only a data range for use in calculating a center from the data interpolated in the process S22. By way of example, the optical path length ratio calculator 51 sets a threshold value for use in the calculation of the center to be A %, and puts 0 (zero) into the intensity data Y equal to or less than a maximum intensity ($Y_{MAX} \times A$) of the peak. Upon the completion of the process S24, a center calculation processing is performed (S26).

In the process S26, the optical path length ratio calculator 51 calculates a weighting center from the data interpolated in the process S24 (a weighting center calculation process). By way of example, the following expression (10) is used therefor.

[Expression 10]

$$2 \cdot n \cdot d = \frac{\sum_{i=1}^{N}(Y_i \cdot X_i)}{\sum_{i=1}^{N} Y_i} \quad (10)$$

N is a number of data points after the extraction of the center range. By using the expression (10), the optical path length nd can be calculated. In this way, the first optical path length $n_1 d$ of the output light of the first wavelength range and the second optical path length $n_2 d$ of the output light of the second wavelength range are calculated. Upon the completion of the process S26, an optical path length ratio calculating processing is performed (S28).

In the process S28, the optical path length ratio calculator 51 calculates an optical path length ratio by using the first optical path length $n_1 d$ and the second optical path length $n_2 d$ obtained in the process S26 (a process of calculating the optical path length ratio). The optical path length ratio calculator 51 calculates the optical path length ratio by using, for example, the expression (6). Accordingly, the optical path length ratio calculator 51 is capable of expressing the optical path length ratio as the refractive index ratio. Upon the completion of the process S28, a temperature calculation processing is performed (S30).

In the process S30, the temperature calculator 55 calculates the temperature of the measurement target object 5 based on the optical path length ratio obtained in the process S28 and the relationship between the refractive index ratio and the temperature of the measurement target object 5 (a process of calculating the temperature). The temperature calculator 55 uses, for example, the temperature correction data 56 shown in FIG. 5 as the relationship between the refractive index ratio and the temperature of the measurement target object 5. For example, in the temperature calculator 55, the refractive index ratio is calculated from the optical path length ratio obtained in the process S28, and the temperature corresponding to the calculated refractive index ratio in the temperature correction data 56 is obtained. Upon the completion of the process S30, the temperature measurement method MT shown in FIG. 6 is ended.

Now, an operation and an effect of the temperature measurement system 1 and the temperature measurement method MT according to the exemplary embodiment will be briefly discussed. In the following, to compare with the exemplary embodiment, a conventional temperature measurement system and a conventional temperature measurement method will be first explained. First, correction data indicating a relationship between a normalized optical path length and a temperature is previously acquired for a correction sample which is made of the same material as the measurement target object 5. First, for each temperature controlled by a temperature corrector, an interferometer measures the optical path length of the correction sample, and a thermometer measures the temperature of the correction sample. Then, the measured optical path length of the correction sample is normalized to an optical path length of the correction sample measured at a preset temperature (for example, 40° C.). Accordingly, the correction data indicating the relationship between the temperature and the normalized optical path length is acquired. The normalized optical path length indicates a fluctuation rate of the optical path length to a temperature variation with respect to the preset temperature, and this data does not rely on a thickness of the correction sample. Subsequently, the optical path length of the measurement target object 5 is actually measured, and the temperature of the measurement target object 5 is measured at the same time through a separate method, so that actual measurement data indicating the actually measured optical path length with respect to the actually measured temperature is acquired. Thereafter, the correction data is converted so that the relationship between the temperature and the normalized optical path length indicated by the correction data is applied to the actual measurement data as well. Accordingly, the relationship between the optical path length and the temperature in the measurement target object 5 is obtained. Then, the temperature of the measurement target object 5 is calculated based on the measured optical path length of the measurement target object 5 and this relationship between the optical path length and the temperature in the measurement target object 5.

As stated above, in the conventional temperature measurement system and temperature measurement method, the optical path length needs to be actually measured for each measurement target object 5, and the temperature of the measurement target object 5 needs to be actually measured at the same time through the separate method. Depending on a measurement environment, however, it may be difficult to install the thermometer, and the temperature of the measurement target object 5 may not be actually measured through the separate method. As a resolution, the temperature of the measurement target object 5 is estimated from an ambient temperature around the measurement target object 5, and this estimated temperature is used as actually measured data. However, the estimated temperature includes an error, and the error affects the temperature measurement of the measurement target object 5. As stated above, in the conventional temperature measurement system and temperature measurement method, the temperature of the measurement target object 5 may not be actually measured with high accuracy.

In contrast, in the temperature measurement system 1 and the temperature measurement method MT according to the exemplary embodiment, only if the temperature correction data 56 (the relationship between the optical path length ratio (refractive index ratio) and the temperature) is already known, the actual measurement data of the optical path length and the temperature need not be acquired for each measurement target object 5, unlike in the conventional case. That is, in the temperature measurement system 1 and the temperature measurement method MT according to the exemplary embodiment, the correction data (the relationship between the temperature and the normalized optical path length at this temperature) need not be corrected for each measurement target object before the temperature measurement, unlike in the conventional case. Therefore, in this temperature measurement system 1 and the temperature measurement method MT, a measurement sequence can be simplified as compared to the conventional temperature measurement system and temperature measurement method in which the actual measurement data is acquired for each measurement target object 5 and the correction data is corrected for each measurement target object 5 before the temperature measurement.

According to the temperature measurement system 1 and the temperature measurement method MT, the temperature of the measurement target object 5 can be measured with high accuracy. By way of example, even if the thickness of the measurement target object 5 is reduced as it is worn out, the temperature calculator 55 is still capable of measuring the temperature of the measurement target object 5 since the variation of the thickness does not affect the optical path length ratio.

According to the temperature measurement system 1 and the temperature measurement method MT, the first spectrometer 42 is capable of narrowing a distribution measurement range thereof to a wavelength range suitable for the measurement of the first reflected light, and the second spectrometer 44 is capable of narrowing a distribution measurement range thereof to the wavelength range suitable for the measurement of the second reflected light. Therefore, a resolution of each spectrometer can be increased, so that the reflected light spectrum can be measured accurately.

According to the temperature measurement system 1 and the temperature measurement method MT, since the multiple optical elements 30 are provided, multipoint measurement can be performed. According to the temperature measurement system 1 and the temperature measurement method MT, the light in the wavelength range from 1200 nm to 1300 nm and the light in the wavelength range from 1500 nm to 1600 nm are irradiated to the measurement target object 5 which is made of at least one of silicon, quartz and sapphire. Thus, absorption of the output light in the measurement target object 5 can be suppressed.

Furthermore, the above-described exemplary embodiment provides an example of the temperature measurement system 1 and the temperature measurement method MT. The apparatus and the method of the exemplary embodiment can be modified, or the temperature measurement system 1 and the temperature measurement method MT may have other applications.

Figure 9:
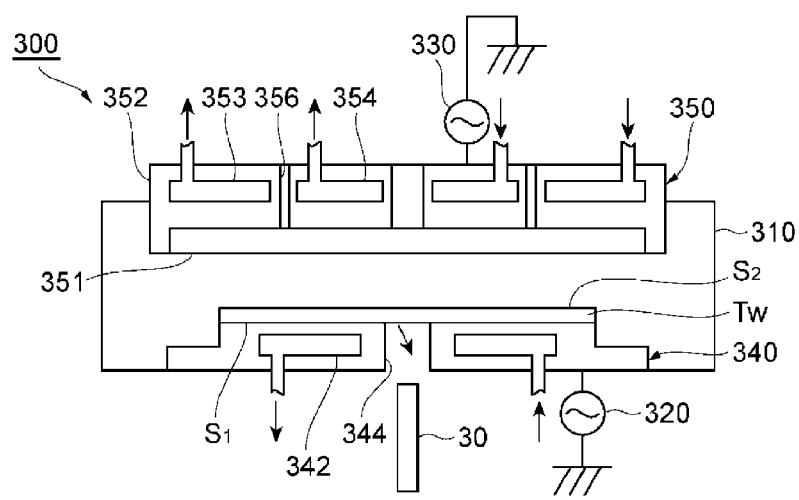
FIG. 9 depicts an example of a substrate processing apparatus according to the exemplary embodiment.

By way of example, the temperature measurement system 1 described in the exemplary embodiment may be applied to a substrate processing apparatus 300. FIG. 9 illustrates an example of a substrate processing apparatus. Here, the description will be provided for an example where the temperature measurement system 1 is used to measure a temperature of a wafer Tw as an example of the measurement target object 5 in the substrate processing apparatus such as, for example, a plasma etching apparatus. Further, the measurement target object 5 can be any component as long as it is accommodated in the substrate processing apparatus 300. By way of example, the measurement target object 5 may be at least one of a substrate, a focus ring and an upper electrode. If an object accommodated in a processing chamber is made of a material having transmissivity for the light of the first wavelength range and the light of the second wavelength range, this object can be used as the measurement target object 5, and the temperature of this object may be measured. In this case, the measurement target object 5 may be made of silicon, quartz or sapphire.

As the first light source 11 and the second light source 12, a light source capable of emitting light which is reflected after penetrating both surfaces $S_1$ and $S_2$ of the wafer Tw as the measurement target object is used. By way of example, since the wafer Tw is made of silicon, a light source capable of emitting light having a wavelength ranging from 1.2 μm to 2.5 μm capable of penetrating a silicon material such as silicon or a silicon oxide film is used as each of the first light source 11 and the second light source 12.

The substrate processing apparatus 300 is equipped with, as illustrated in FIG. 9, a processing chamber 310 configured to perform a preset processing such as an etching processing or a film forming processing on the wafer Tw, for example.

That is, the wafer Tw is accommodated in the processing chamber 310. The processing chamber 310 is connected to a non-illustrated exhaust pump and configured to be evacuated. An upper electrode 350 and a lower electrode 340 facing the upper electrode 350 are disposed within the processing chamber 310. The lower electrode 340 also serves as a placing table for placing the wafer Tw thereon. An electrostatic chuck (not shown) configured to attract the wafer Tw electrostatically is provided at an upper portion of the lower electrode 340. Further, the lower electrode 340 is equipped with a cooling mechanism. For example, this cooling mechanism is configured to circulate a coolant in a coolant path 342 which is formed to a substantially annular shape in the lower electrode 340, to thereby control a temperature of the lower electrode 340. Accordingly, a temperature of the wafer Tw is controlled. The wafer Tw is carried into the processing chamber 310 from a gate valve (not shown) which is provided at, for example, a lateral side of the processing chamber 310. The lower electrode 340 and the upper electrode 350 are respectively connected with a high frequency power supply 320 and a high frequency power supply 330 configured to apply preset high frequency powers thereto.

The upper electrode 350 has a structure in which an electrode plate 351 at the bottommost side is supported by an electrode support 352. The electrode plate 351 is formed of, for example, a silicon material (silicon, a silicon oxide, etc.), and the electrode support 352 is made of, by way of example, an aluminum material. An inlet line (not shown) through which a preset processing gas is introduced is provided at an upper portion of the upper electrode 350. The electrode plate 351 is provided with a multiple number of discharge holes (not shown) to allow the processing gas introduced from the inlet line to be uniformly discharged toward the wafer Tw placed on the lower electrode 340.

The upper electrode 350 is equipped with a cooing mechanism. For example, this cooling mechanism is configured to circulate a coolant in a coolant path formed within the electrode support 352 of the upper electrode 350, to thereby control a temperature of the upper electrode 350. The coolant path is formed to have a substantially annular shape, and has a dual system including, for example, an outer coolant path 353 for cooling an outer side within a surface of the upper electrode 350 and an inner coolant path 354 for cooling an inner side within the surface of the upper electrode 350. The coolant is supplied from a supply line into each of the outer coolant path 353 and the inner coolant path 354 and drained from a drain line back into an external cooler (not shown) after flowing through the coolant paths 353 and 354 to be circulated, as indicated by arrows in FIG. 9. The same coolant may be circulated in this dual-system coolant path, or different coolants may be circulated. Furthermore, the cooling mechanism for the upper electrode 350 is not limited to having the dual-system coolant path shown in FIG. 9, but may have a single-system coolant path or a single-system coolant path with two branches.

In the electrode support 352, a low-heat transfer layer 356 is provided between an outer portion where the outer coolant path 353 is provided and an inner portion where the inner coolant path 354 is provided. Accordingly, due to an effect of the low-heat transfer layer 356, a heat transfer between the outer portion and the inner portion of the electrode support 352 becomes difficult. Thus, by controlling the coolant(s) in the outer coolant path 353 and the inner coolant path 354, the outer portion and the inner portion can be controlled to have different temperatures. Therefore, a temperature within the surface of the upper electrode 350 can be controlled efficiently and accurately.

In this substrate processing apparatus 300, the wafer Tw is carried into the processing chamber 310 through the gate valve by, for example, a transfer arm or the like. The wafer Tw carried into the processing chamber 310 is placed on the lower electrode 340. High frequency powers are applied to the upper electrode 350 and the lower electrode 340, and the preset processing gas is introduced into the processing chamber 310 through the upper electrode 350. Accordingly, the processing gas introduced through the upper electrode 350 is excited into plasma, so that an etching processing, for example, is performed on a front surface of the wafer Tw.

The output light in the above-described temperature measurement system 1 is irradiated via the optical element 30 toward the wafer Tw as the measurement target object through the lower electrode 340. To elaborate, the optical element 30 is placed to allow the output light to be irradiated toward the wafer Tw through a through hole 344 formed in, for example, a central portion of the lower electrode 340. Further, an in-surface position of the wafer Tw where the optical fibers F are disposed is not limited to the central portion of the wafer Tw as shown in FIG. 9 as long as the output light can be irradiated to the wafer Tw. By way of example, the optical fibers F may be disposed to allow the output light to be irradiated to an end portion of the wafer Tw.

As stated above, by mounting the temperature measurement system 1 to the substrate processing apparatus 300, a temperature of at least one of the substrate, the focus ring and the upper electrode can be measured accurately. Further, it is also possible to measure a temperature of the wafer Tw as the measurement target object in the etching processing.

Figure 10:
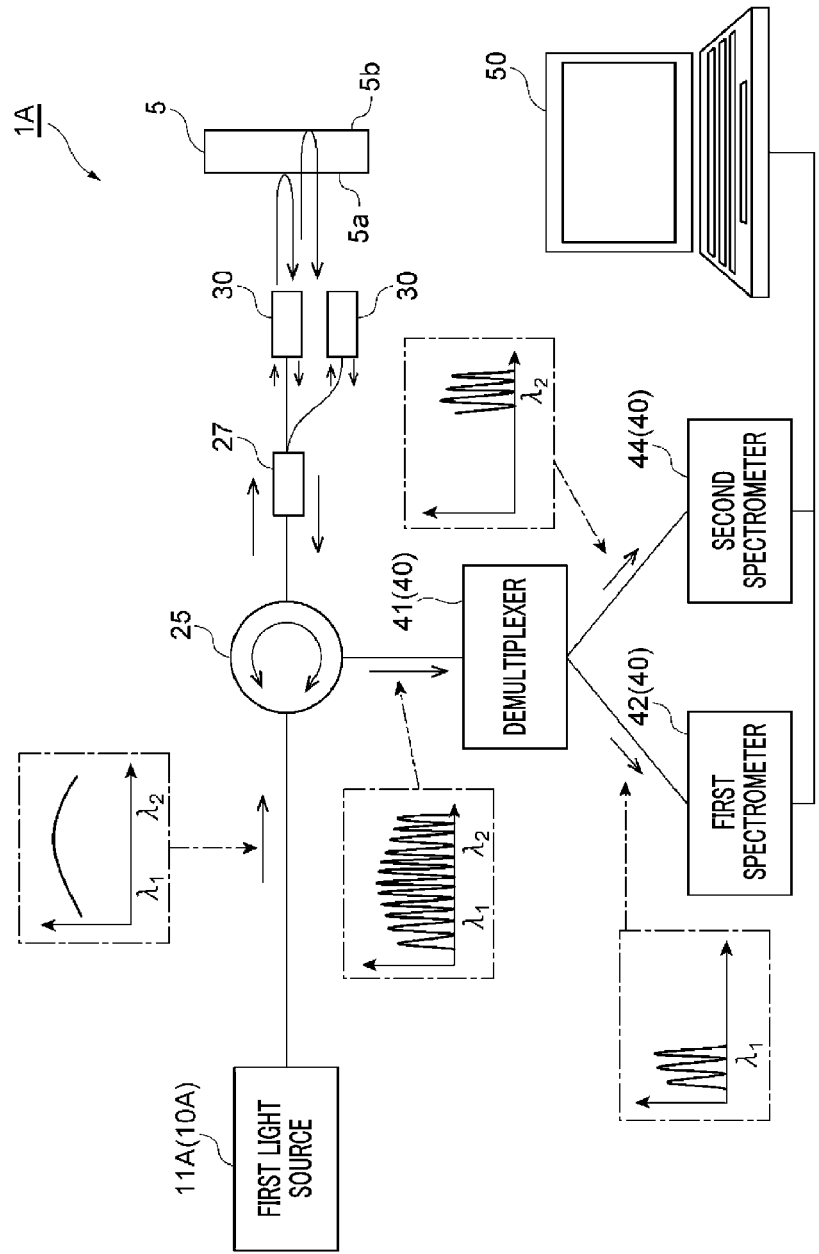
FIG. 10 is a diagram schematically illustrating a temperature measurement system according to a modification example.

Now, a modification example of the temperature measurement system 1 will be described. FIG. 10 is a diagram schematically illustrating a temperature measurement system according to the modification example. The temperature measurement system 1A shown in FIG. 10 is the same as the temperature measurement system 1 shown in FIG. 1 except that a configuration of a light source unit is different from that of the temperature measurement system 1. As depicted in FIG. 10, the light source unit 10A of the temperature measurement system 1A only includes a first light source 11A, without having the second light source 12 and the multiplexer 20.

The first light source 11A is configured to emit output light having a wavelength of a first wavelength range and a second wavelength range. The output light penetrates a measurement target object 5. The output light has a wide wavelength range ranging from, e.g., 1200 nm to 1600 nm. A demultiplexer 41 propagates, among reflected lights obtained via an optical circulator 25, reflected light having a wavelength range ranging from 1200 nm to 1300 nm to a first spectrometer 42, and propagates reflected light having a wavelength range ranging from 1500 nm to 1600 nm to a second spectrometer 44. The principle of temperature measurement is the same as that of the temperature measurement system 1. As stated, the temperature measurement system 1A is capable of measuring a temperature of the measurement target object 5 by generating the output light from the single light source.

Figure 11:
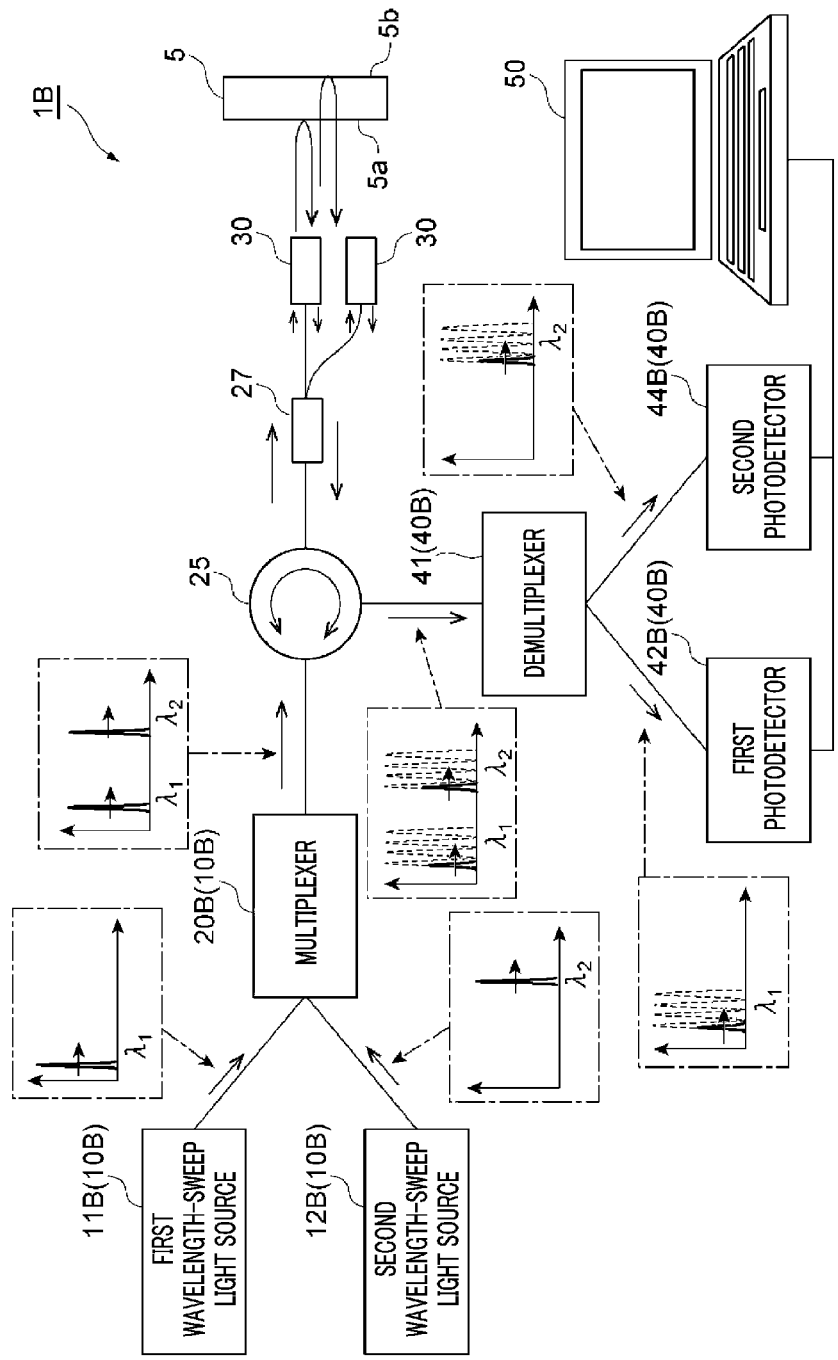
FIG. 11 is a diagram schematically illustrating a temperature measurement system according to another modification example.

FIG. 11 is a diagram schematically illustrating a temperature measurement system according to another modification example. The temperature measurement system 1B shown in FIG. 11 includes a light source unit and a measurement unit having configurations different from those of the temperature measurement system 1 shown in FIG. 1, and other configurations of the temperature measurement system 1B are the same as those of the temperature measurement system 1. As depicted in FIG. 11, the light source unit 10B of the temperature measurement system 1B includes a first wavelength-sweep light source 11B instead of the first light source 11 and a second wavelength-sweep light source 12B instead of the second light source 12. The measurement unit 40B of the temperature measurement system 1B includes a first photodetector 42B instead of the first spectrometer 42 and a second photodetector 44B instead of the second spectrometer 44.

The first wavelength-sweep light source 11B is configured to emit light penetrating the measurement target object 5 and having a wavelength of a first wavelength range. The first wavelength-sweep light source 11B emits wavelength-swept light within a wavelength range ranging from, e.g., 1200 nm to 1300 nm as narrowband light having a regular bandwidth.

The second wavelength-sweep light source 12B is configured to emit second measurement light penetrating the measurement target object 5 and having a wavelength of a second wavelength range. The second wavelength-sweep light source 12B emits wavelength-swept light within a wavelength range ranging from, e.g., 1500 nm to 1600 nm as narrowband light having a regular bandwidth.

The demultiplexer 41 is configured to propagate reflected light obtained from the optical circulator 25 to each photodetector in case that the measurement unit 40B has the multiple photodetectors as mentioned above.

The first photodetector 42B is configured to measure a reflected light spectrum of first reflected light from a front surface 5a and a rear surface 5b of the measurement target object 5 generated by wavelength-swept output light in the first wavelength range. The second photodetector 44B is configured to measure a reflected light spectrum of second reflected light from the front surface 5a and the rear surface 5b of the measurement target object 5 generated by wavelength-swept output light in the second wavelength range.

The first wavelength-sweep light source 11B and the second wavelength-sweep light source 12B emit the narrowband lights. Accordingly, the measurement unit 40B can have the first photodetector 42B and the second photodetector 44B which are the photodetectors respectively having distribution measurement ranges narrowed to the wavelength bands suitable for the measurement of the narrowband reflected light. The principle of the temperature measurement is the same as that of the temperature measurement system 1. As stated above, the temperature measurement system 1B is capable of measuring a temperature of the measurement target object 5 by generating the output lights through the use of the wavelength-sweep light sources and acquiring the reflected light spectrum through the use of the photodetectors.

Figure 12:
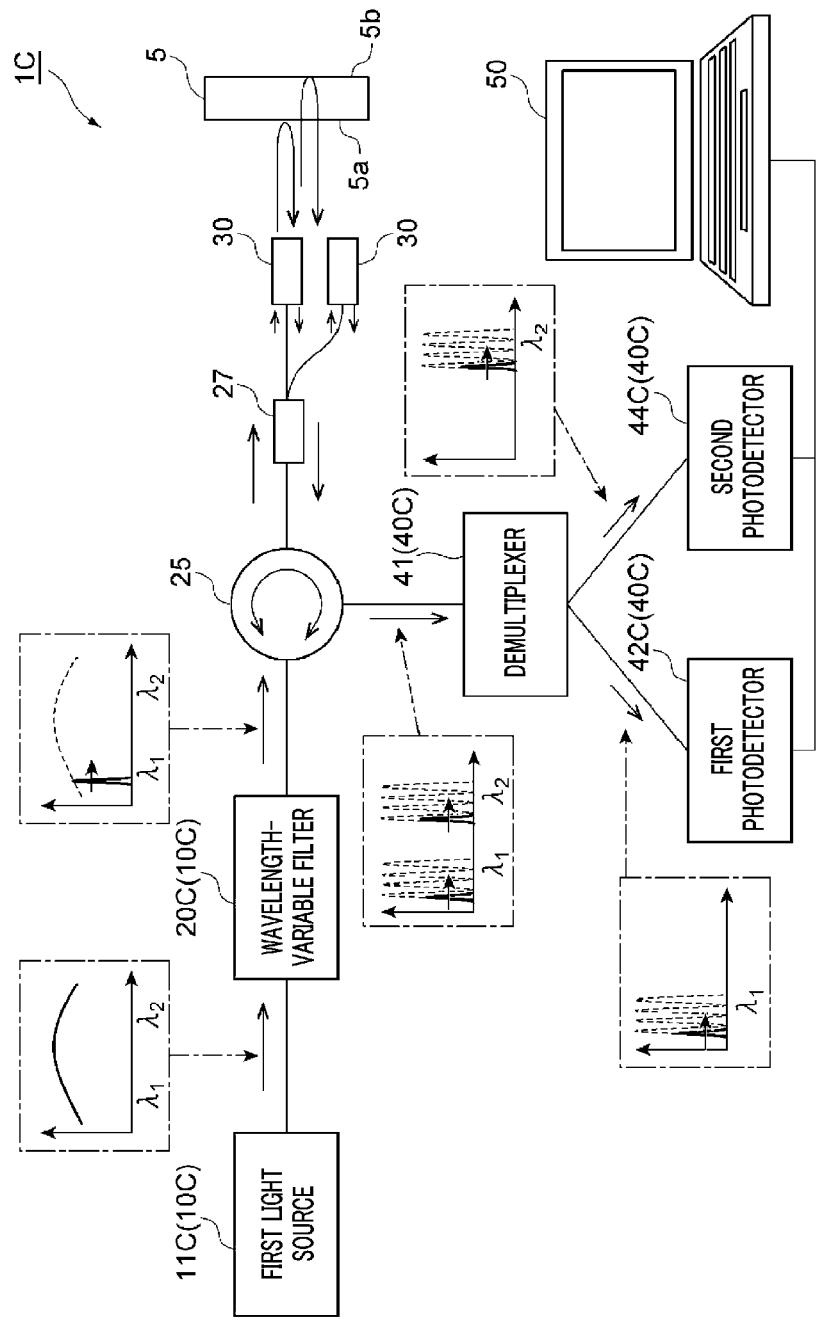
FIG. 12 is a diagram schematically illustrating a temperature measurement system according to yet another modification example.

FIG. 12 is a diagram schematically illustrating a temperature measurement system according to yet another modification example. A configuration of the temperature measurement system 1C shown in FIG. 12 is the same as that of the temperature measurement system 1B shown in FIG. 11 except a light source unit. As illustrated in FIG. 12, a light source unit 10C of the temperature measurement system 1C includes a first light source 11C instead of the first wavelength-sweep light source 11B and the second wavelength-sweep light source 12B and a wavelength-variable filter 20C instead of the multiplexer 20B.

The first light source 11C is the same as the first light source 11A. The wavelength-variable filter 20C is configured to transmit light of the first light source 11C selectively depending on a time and a wavelength of the light. For example, the wavelength-variable filter 20C transmits output light having a preset wavelength band in a predetermined period, and propagates this output light to an optical circulator 25. The principle of temperature measurement is the same as that of the temperature measurement system 1. This temperature measurement system 1C is capable of measuring a temperature of a measurement target object 5 by generating the output light through the use of the light source having a wide wavelength range and the wavelength-variable filter and measuring reflected light through the use of photodetectors.

Figure 13:
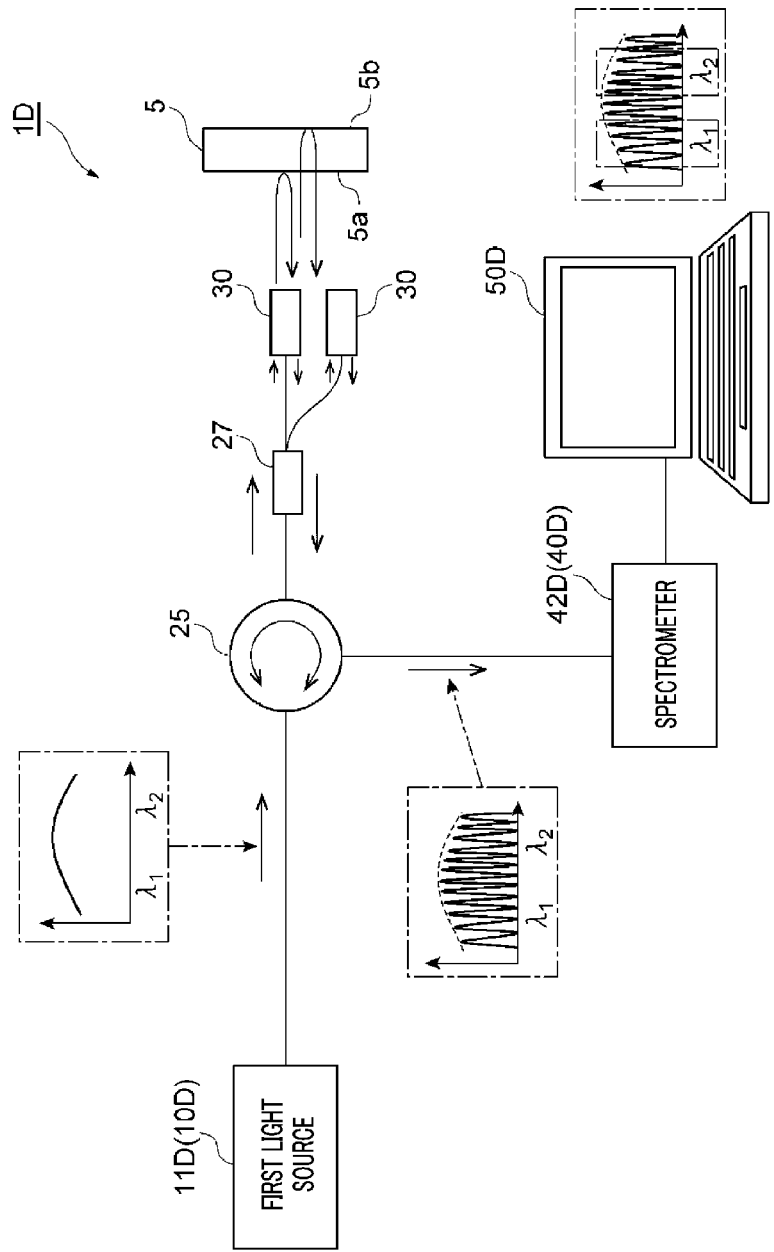
FIG. 13 is a diagram schematically illustrating a temperature measurement system according to still yet another modification example.

FIG. 13 is a diagram schematically illustrating a temperature measurement system according to still yet another modification example. A configuration of the temperature measurement system 1D shown in FIG. 13 is the same as that of the temperature measurement system 1A shown in FIG. 10 except a measurement unit and an operation device. As illustrated in FIG. 13, the measurement unit 40D of the temperature measurement system 1D is not equipped with a demultiplexer and two spectrometers but has a single spectrometer 42D. The temperature measurement system 1D includes an operation device 50D instead of the operation device 50.

The measurement unit 40D measures a reflected light spectrum of reflected light having a wavelength range ranging from 1200 nm to 1600 nm among reflected lights obtained through an optical circulator 25. The operation device 50D operates a reflected light spectrum of reflected light having a wavelength range ranging from 1200 nm to 1300 nm, and operates a reflected light spectrum of reflected light having a wavelength range ranging from 1500 nm to 1600 nm. The principle of temperature measurement is the same as that of the temperature measurement system 1. This temperature measurement system 1D does not have the second light source 12, the multiplexer 20, the demultiplexer 41 and the second spectrometer 44 but is still capable of measuring a temperature of a measurement target object 5 accurately.

According to the exemplary embodiments, it is possible to provide the temperature measurement system and a temperature measurement method capable of measuring the temperature of the measurement target object accurately.

From the foregoing, it will be appreciated that the various embodiments of the present disclosure have been described herein for the purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A temperature measurement system configured to measure a temperature of a measurement target object having a first main surface and a second main surface facing the first main surface, the temperature measurement system comprising:
a light source unit configured to emit output light penetrating the measurement target object and including a first wavelength range and a second wavelength range different form the first wavelength range;
at least one optical element configured to output the output light from the light source unit to the first main surface of the measurement target object and receive reflected light, which is part of the output light reflected from the first main surface and the second main surface;

a measurement unit connected to the at least one optical element and configured to measure a spectrum of the reflected light from the first main surface and the second main surface;

an optical path length ratio calculator configured to calculate, by performing Fourier transform on the spectrum measured by the measurement unit, an optical path length ratio which is a ratio between a first optical path length as an optical path length of the output light of the first wavelength range and a second optical path length as an optical path length of the output light of the second wavelength range; and a temperature calculator configured to calculate the temperature of the measurement target object based on the optical path length ratio and a previously investigated relationship between the temperature of the measurement target object and a refractive index ratio which is a ratio between a first refractive index as a refractive index of the measurement target object with respect to the output light of the first wavelength range and a second refractive index as a refractive index of the measurement target object with respect to the output light of the second wavelength range.

2. The temperature measurement system of claim 1, wherein the light source unit comprises:
a first light source configured to emit light of the first wavelength range;
a second light source configured to emit light of the second wavelength range; and
a multiplexer configured to propagate the output light obtained by multiplexing the light of the first wavelength range and the light of the second wavelength range.

3. The temperature measurement system of claim 1, wherein the measurement unit comprises:
a first spectrometer configured to measure the spectrum of first reflected light which is the reflected light from the first main surface and the second main surface generated by the output light of the first wavelength range; and
a second spectrometer configured to measure the spectrum of second reflected light which is the reflected light from the first main surface and the second main surface generated by the output light of the second wavelength range.

4. The temperature measurement system of claim 1, wherein the at least one optical element includes multiple optical elements.

5. The temperature measurement system of claim 1, wherein the measurement target object is made of silicon, the first wavelength range is from 1200 nm to 1300 nm, and
the second wavelength range is from 1500 nm to 1600 nm.

6. The temperature measurement system of claim 1, wherein the at least one optical element is provided in a substrate processing apparatus configured to accommodate the measurement target object therein, and
the measurement target object is at least one of a substrate, a focus ring or an upper electrode.

7. A temperature measurement method of measuring a temperature of a measurement target object having a first main surface and a second main surface facing the first main surface, the temperature measurement method comprising:
irradiating, to the measurement target object, output light penetrating the measurement target object and including a first wavelength range and a second wavelength range different form the first wavelength range;
measuring a spectrum of reflected light, which is part of the output light reflected from the first main surface and the second main surface of the measurement target object;
calculating, by performing Fourier transform on the spectrum, an optical path length ratio which is a ratio between a first optical path length as an optical path length of the output light of the first wavelength range and a second optical path length as an optical path length of the output light of the second wavelength range; and
calculating the temperature of the measurement target object based on the optical path length ratio and a previously investigated relationship between the temperature of the measurement target object and a refractive index ratio which is a ratio between a first refractive index as a refractive index of the measurement target object of the output light of the first wavelength range and a second refractive index as a refractive index of the measurement target object of the output light of the second wavelength range.

* * * * *